United States Patent [19]

Caridis et al.

[11] 4,167,585

[45] Sep. 11, 1979

[54] METHOD FOR HEATING AND COOKING FOODS IN A CLOSED TREATMENT CHAMBER BY MAINTAINING THE TEMPERATURE AND MOISTURE CONTENT

[75] Inventors: Andrew A. Caridis, Foster City; Clark K. Benson, Millbrae, both of Calif.

[73] Assignee: Heat and Control, Inc., San Francisco, Calif.

[21] Appl. No.: 853,503

[22] Filed: Nov. 21, 1977

Related U.S. Application Data

[63] Continuation of Ser. No. 662,512, Mar. 1, 1976, abandoned, which is a continuation-in-part of Ser. No. 544,393, Jan. 27, 1975, Pat. No. 3,947,241, which is a continuation of Ser. No. 328,925, Feb. 2, 1973, abandoned.

[51] Int. Cl.² ............... A22C 17/00; A22C 25/00; F27B 9/00; F27B 9/14
[52] U.S. Cl. .................... 426/233; 99/331; 99/443 C; 99/474; 426/307; 426/438; 426/510; 426/511; 426/523; 432/23; 432/37
[58] Field of Search ............. 426/307, 438, 441, 474, 426/509, 510, 523, 233, 520, 511; 99/360, 361, 362, 443 C, 450, 474, 477, 386, 331, 325; 432/23, 37, 121, 144, 148, 152, 176, 198, 14

[56] References Cited

U.S. PATENT DOCUMENTS

| 992,488 | 5/1911 | Von Epler | 426/510 |
|---|---|---|---|
| 2,199,584 | 5/1940 | Bemis | 426/523 |
| 3,199,436 | 8/1965 | Rasmussen et al. | 99/473 |
| 3,224,881 | 12/1965 | Holtz | 426/510 |
| 3,237,551 | 3/1966 | Keifer | 99/475 |
| 3,644,124 | 2/1972 | Bedsole | 426/233 |
| 3,736,860 | 6/1973 | Vischer, Jr. | 99/443 C |
| 3,764,343 | 10/1973 | Paugh | 426/523 |
| 3,815,488 | 6/1974 | Van Dyke, Jr. | 99/443 C |
| 3,865,964 | 2/1975 | Kellermeier et al. | 426/438 |
| 3,910,175 | 10/1975 | Smith | 99/477 |

FOREIGN PATENT DOCUMENTS

| 587056 | 12/1965 | Belgium . |
|---|---|---|
| 672480 | 12/1965 | Belgium . |
| 930503 | 6/1955 | Fed. Rep. of Germany . |
| 1429906 | 3/1971 | Fed. Rep. of Germany . |
| 987633 | 11/1950 | France . |
| 1048030 | 7/1953 | France . |
| 338286 | 11/1930 | United Kingdom . |
| 602402 | 5/1948 | United Kingdom . |
| 1116881 | 5/1948 | United Kingdom . |
| 746035 | 3/1956 | United Kingdom . |

OTHER PUBLICATIONS

Tressler et al., "The Freezing Preservation of Foods", vol. 3, pp. 270–271, Easton, Pa., Avi Publishing Co. Inc.

Primary Examiner—S. Leon Bashore
Assistant Examiner—Steve Alvo
Attorney, Agent, or Firm—Flehr, Hohbach, Test, Albritton & Herbert

[57] ABSTRACT

The cooking process comprises the steps of providing a food treatment chamber equipped with a vapor pervious conveyor; preparing a moving stream of a process vapor at a temperature having a lower range of between 165° F. to 212° F.; circulating the stream along the conveyor; injecting water vapor into the moving stream of process vapor and supplying heat to the moving stream to control the temperature and moisture content of the process vapor; placing the food product in discrete pieces upon the conveyor; and moving the product continuously in its original position on the conveyor through the treatment chamber.

13 Claims, 13 Drawing Figures

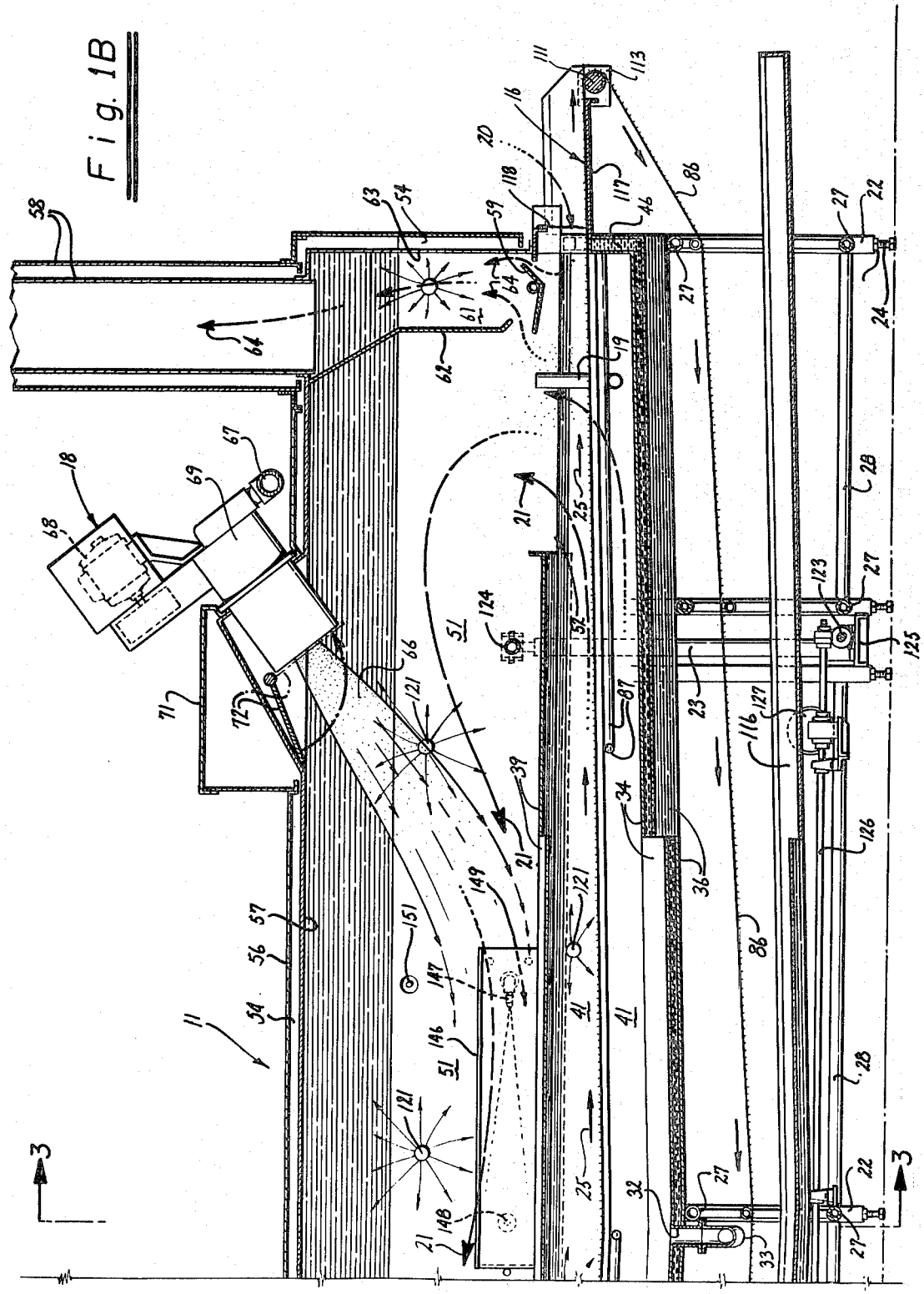

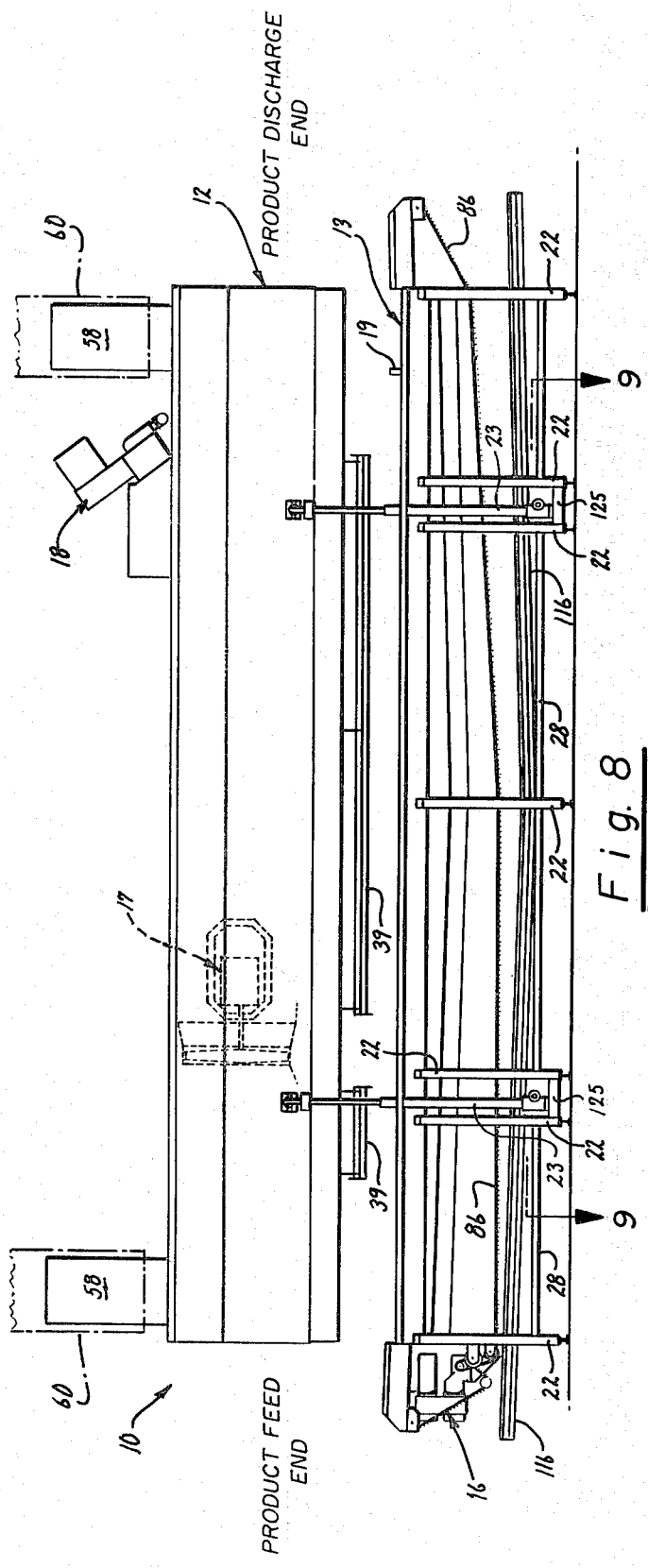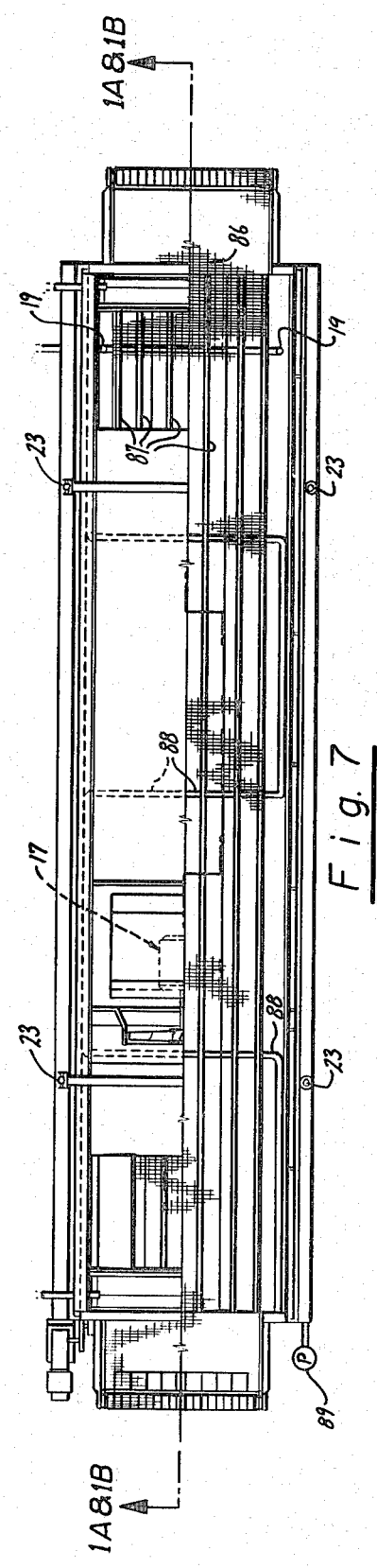

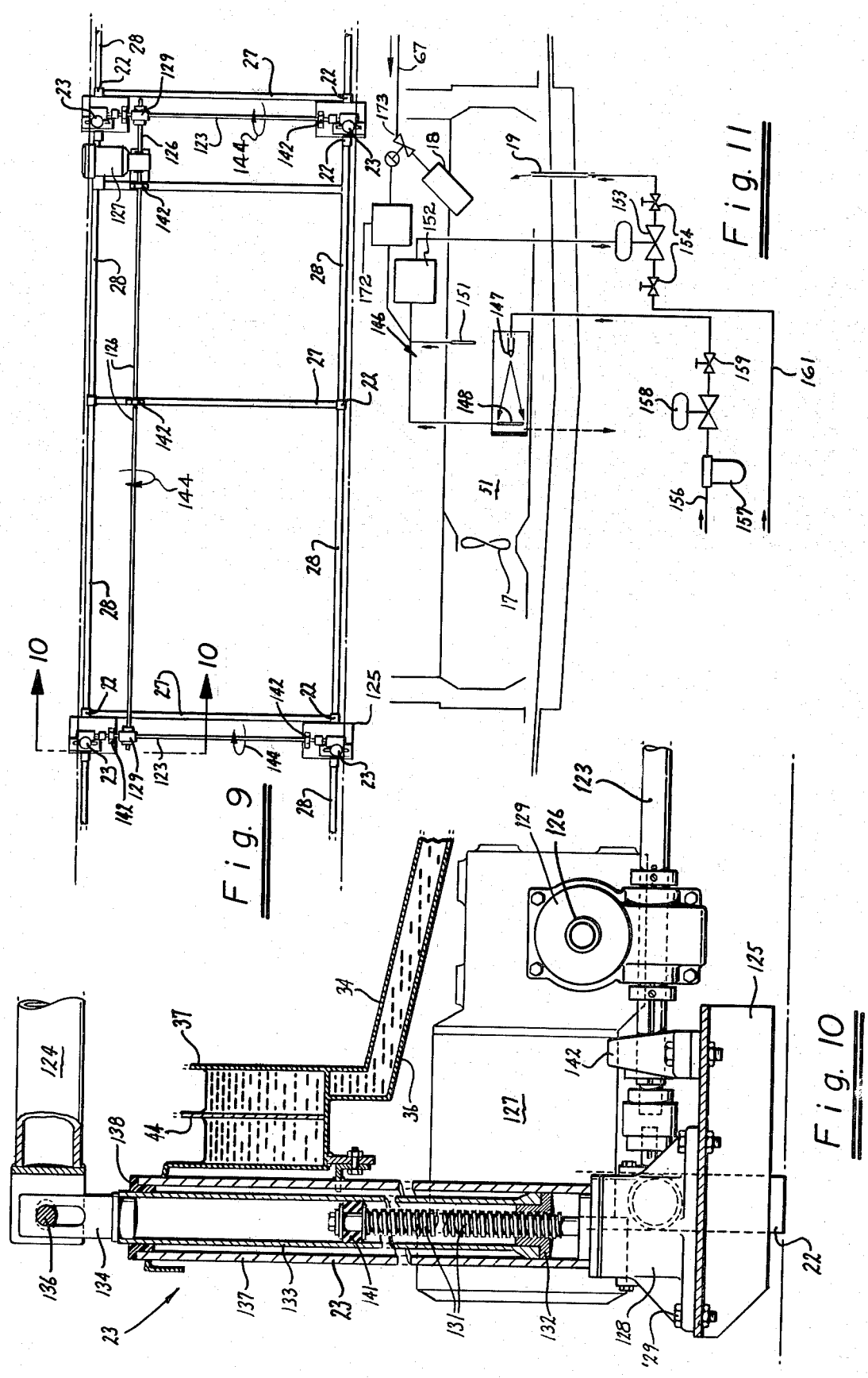

METHOD FOR HEATING AND COOKING FOODS IN A CLOSED TREATMENT CHAMBER BY MAINTAINING THE TEMPERATURE AND MOISTURE CONTENT

CROSS-REFERENCE TO RELATED APPLICATION

This application is a continuation of co-pending application, Ser. No. 662,512, filed Mar. 1, 1976, which application was a continuation-in-part from then co-pending application, Ser. No. 544,393, filed Jan. 27, 1975, now U.S. Pat. No. 3,947,241. The latter application was a continuation of a parent application Ser. 328,925, filed Feb. 2, 1973, now abandoned assigned to Heat and Control, Inc.

BACKGROUND OF THE INVENTION

This invention concerns the method for the treatment of food including treatment of solid food products in a super-heated water vapor or steam-laden atmosphere.

In food treatment, and particularly in the case of meat products, it is desirable that the end product should be attractive in appearance including the color, texture and shape. The moisture content of a solid food product should be controllable during heat treatment. It is desirable that a food product be subjected to handling or movement as little as possible in processing so as to preserve the shape of the product and to avoid crumbling.

SUMMARY OF THE INVENTION AND OBJECTS

In summary the invention relates to an oven providing an elongated processing path and comprising within a housing a cooking chamber having a continuous conveyor extending therethrough, said conveyor being of perforate construction so as to permit passage therethrough of the process atmosphere. A heating chamber is provided in the oven housing arranged in communication with the cooking chamber, the heating chamber having a heating unit therein for raising the temperature of the process atmosphere. Means are provided for injecting water vapor into the process atmosphere and means are provided for recirculating the process atmosphere from said heating chamber.

The process of the invention comprises providing a food treatment chamber equipped with a vapor pervious conveyor; preparing a moving stream of process vapor at a temperature having a lower range of between 165° F. to 212° F. and circulating said proess vapor along and through the conveyor; injecting water vapor into the moving stream of process vapor and supplying heat to the process vapor; placing the food product in discrete pieces upon the conveyor and moving the product continuously in its original position on the conveyor through the food treatment chamber.

An object of the invention is to provide an improved process for applying heat to a solid food product through circulation thereabout of a process vapor containing a large component of water vapor.

Another object of the invention is to provide an improved oven for cooking, baking and broiling a wide variety of food products, which oven achieves the functions of fryers, infra-red and open flame broilers, ovens and blanchers.

Another object of the invention is to provide an improved cooking process of the type described above which includes the collection of all product drippings for further use as gravies or saleable renderings.

Other objects of the present invention will be apparent from the following detailed description of the preferred embodiment considered in connection with the attached drawings.

BRIEF DESCRIPTION OF THE DRAWINGS

FIGS. 1A and 1B are each longitudinal, vertical sectional views taken in the direction of the arrows 1A and 1B of FIG. 7;

FIG. 7 is a longitudinal, horizontal, sectional view taken in the direction of the arrows 7—7 of FIG. 4;

FIG. 8 is a side elevational view of the oven of the present invention showing the upper portion thereof in the raised condition such as for inspection, maintenance or cleaning;

FIG. 9 is a longitudinal, horizontal, sectional view taken in the direction of the arrows 9—9 of FIG. 8;

FIG. 10 is an enlarged, fragmentary, sectional view through one of the hoists taken in the direction of the arrows 10—10 in FIG. 9;

FIG. 11 is a schematic representation of a moisture control system useful with the present invention.

DESCRIPTION OF THE PREFERRED EMBODIMENT

Figure 1A:
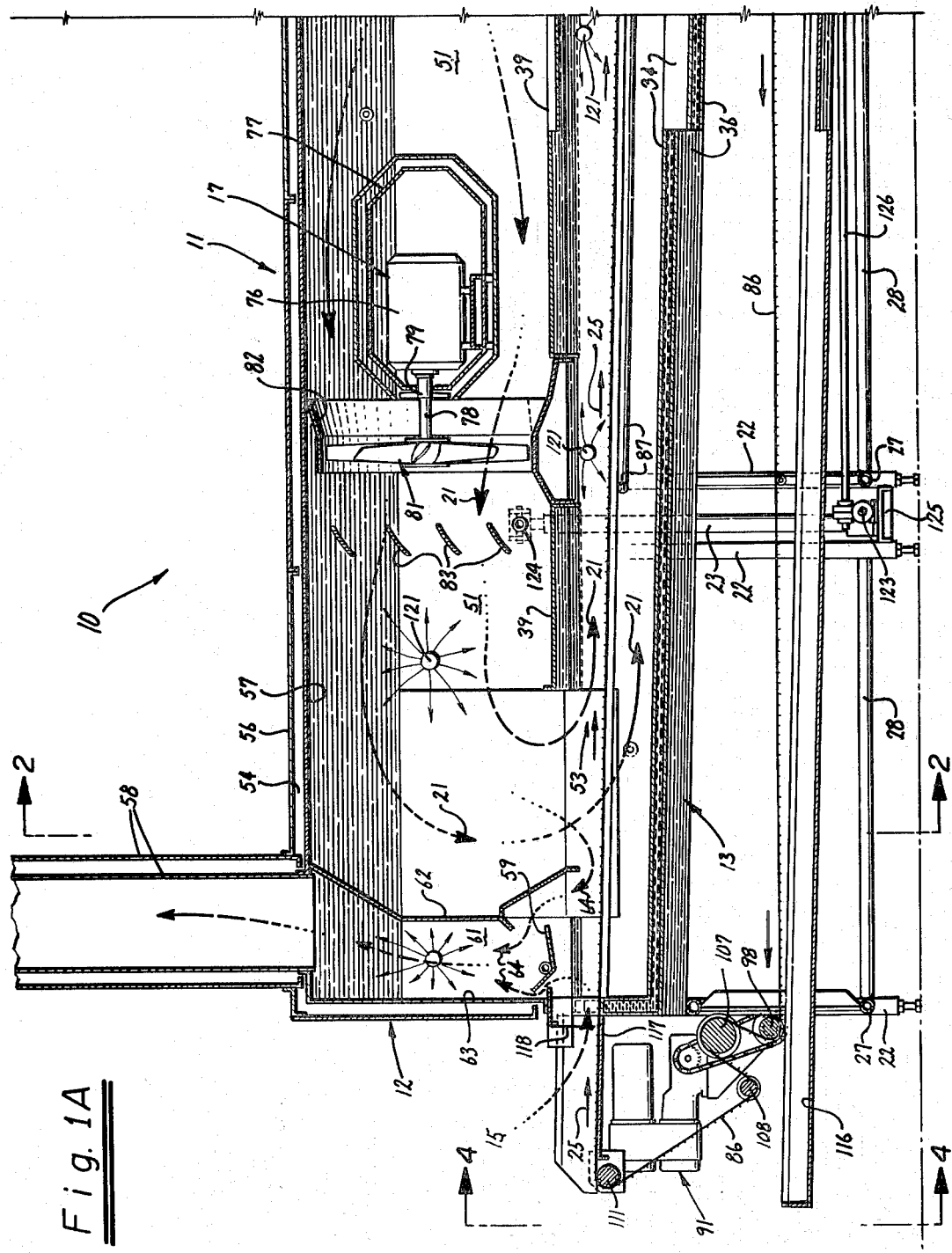

The food treatment unit or oven 10 of the present invention, as illustrated in the drawings (FIGS. 1A, 1B, 7 and 8), comprises in general a shell 11 divisible in a horizontal plane into an upper shell portion 12 and a lower shell portion 13, a framework 14, an endless conveyor 16, a circulating fan 17, a heating unit 18 which may be electric powered cal-rods or a natural gas burner, and steam discharge nozzles 19. In viewing the drawings it will be understood that the product feed end of the oven 10 is shown on the left of FIG. 1A and FIGS. 7 and 8, and the product discharge end is shown on the right in FIG. 1B and FIGS. 7 and 8. Thus the direction of movement of the top run of the endless conveyor 16 is from the left to the right as indicated by the arrows 25, and the process vapor within the oven is circulated by the fan 17 in the direction of the arrows 21 of FIGS. 1A and 1B concurrent with the direction of conveyor movement.

Considering now the oven apparatus in more detail, and referring particularly to the framework, reference will be made to FIGS. 1A, 1B, 2, 3, 7 and 8. In general, the framework comprises interconnected horizontal and vertical members including the seven pairs of legs 22 arranged respectively at the center, at each end of the oven, and two pairs at each of the two lifting sections defined by the four hoists 23, also arranged in pairs. As shown best in FIG. 8, the function of the four hoist 23 is to elevate the upper shell portion 12 and this will be described in more detail below. Each of the legs 22 is equipped with height adjusting means for leveling the oven and which comprises an adjustment screw 24 which is threadably mounted in the base of the leg and held securely in a selected position by a lock nut 26. Horizontally arranged cross members 27 extend transversely of the oven and interconnect the legs 22 in pairs. Longitudinally extending horizontal members 28 maintain the legs in a fixed supporting attitude providing a rigid, light framework for the oven structure. The frame members 22, 27 and 28 may be made up from tubing which is desirable in shape because of its ease of external cleaning, good strength to weight ratio and favorable appearance.

As mentioned above, the shell or housing 11 is divisible along a horizontal plane and comprises the upper shell portion 12 which is shown in FIG. 8 in the raised condition being supported therein by the two pairs of hoists 23. The upper shell 12 is raised both for purposes of cleaning, inspection and maintenance of the oven interior. The upper 12 and lower 13 shell portions are shown in the closed conditions for operating in FIGS. 1-3 wherein a water seal 31 is provided for retaining the process atmosphere within the oven, confining the cooking gases against escape to the surrounding plant, and also to prevent entrainment of air into the oven which degrades the process atmosphere. The water seal 31 also acts as an explosion release should there suddenly occur a great rise in pressure within the oven.

Figure 2:
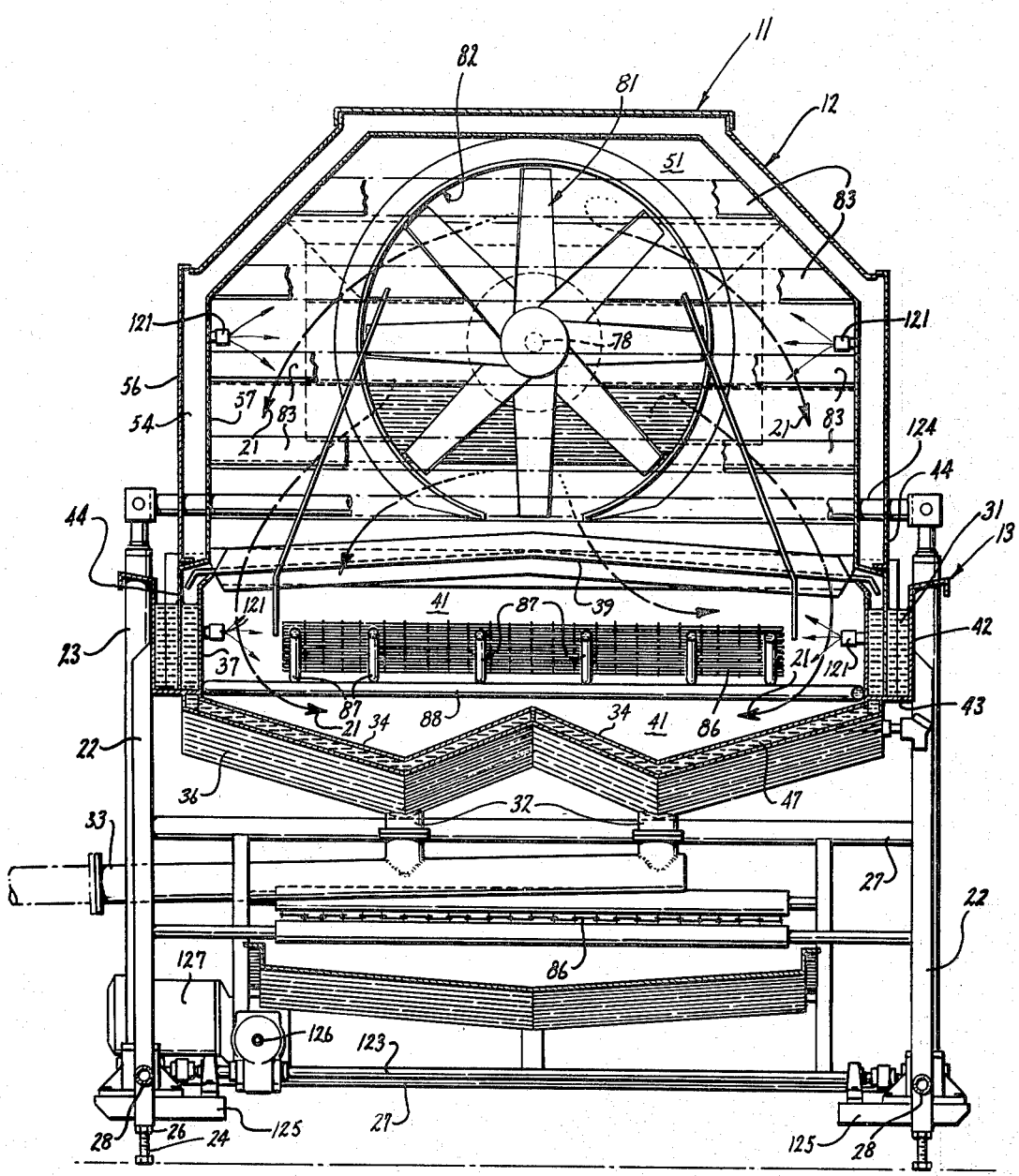
FIG. 2 is a transverse, sectional view taken in the direction of the arrows 2—2 of FIG. 1A.
Figure 3:
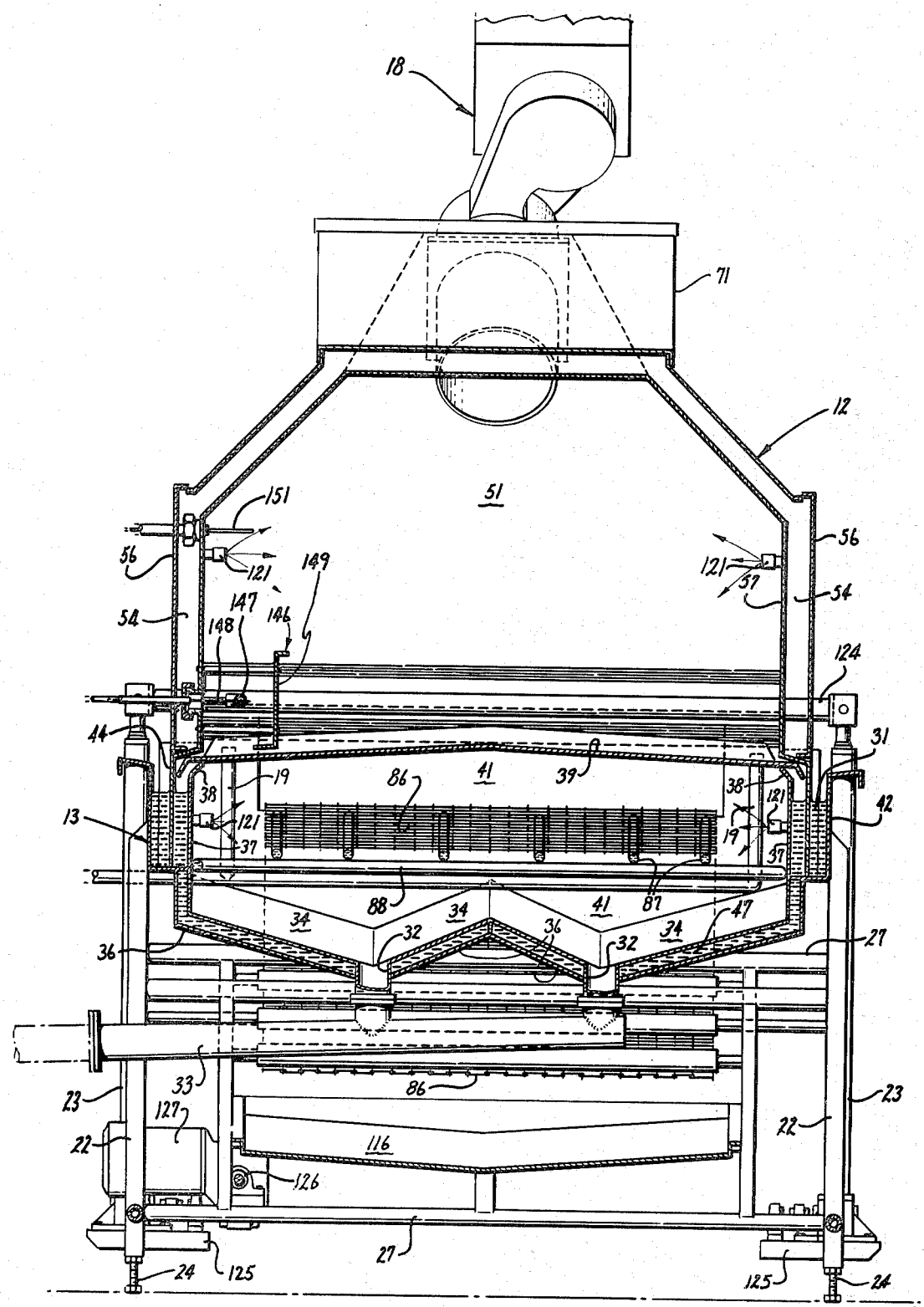
FIG. 3 is a view like FIG. 2 taken in the direction of the arrows 3—3 of FIG. 1B.

The lower shell of housing portion 13 is supported on the framework 14 being connected to the uprights or legs 22. The lower shell portion is of double-wall construction, as shown in FIGS. 2 and 3, and the bottom slopes from each end towards a low point midway along its length (FIGS. 1A and 1B) where a pair of drain nozzles 32 are positioned for carrying off into a manifold 33 juices, fats or other liquids falling from the product into the lower shell portion. As viewed in transverse cross-section, FIGS. 2 and 3, the lower shell portion has a configuration resembling the letter "W". The spaced double walls provide a passageway for circulation of a liquid coolant such as water so that the bottom portion inside wall 34 may be maintained at a relatively low temperature (e.g. 170° to 180° F.) which would preserve fats and juices from the product relatively intact and will prevent them from becoming overheated or burned on to the inside surfaces. Thus it will be understood that the inside wall 34 and the outside wall 36 are spaced apart throughout the length of the oven 10 to provide space for circulation of coolant along the bottom of the lower shell portion 13. Side walls 37 extend upwardly from the inside bottom wall 34 and terminate in an inwardly inclined flange 38 which serves as the support for horizontally disposed pans or covers 39 which, with the walls 34 and 37, serve to define a cooking chamber 41 within the food treatment unit 10.

Spaced laterally outwardly of the side wall 37 there is provided the wall member 42 which joins with the wall member 37, the wall member 42 having a bottom horizontally disposed wall 43 (FIG. 2) integral therewith which unites the inside wall 37 forming a longitudinally extending channel which, when filled with water, defines the water seal 31 for receipt of the vertical skirts 44 from the upper shell portion. The water contained in the water seal 31 is circulated independently of the system for circulating water along the bottom of the lower shell portion.

Figure 5:
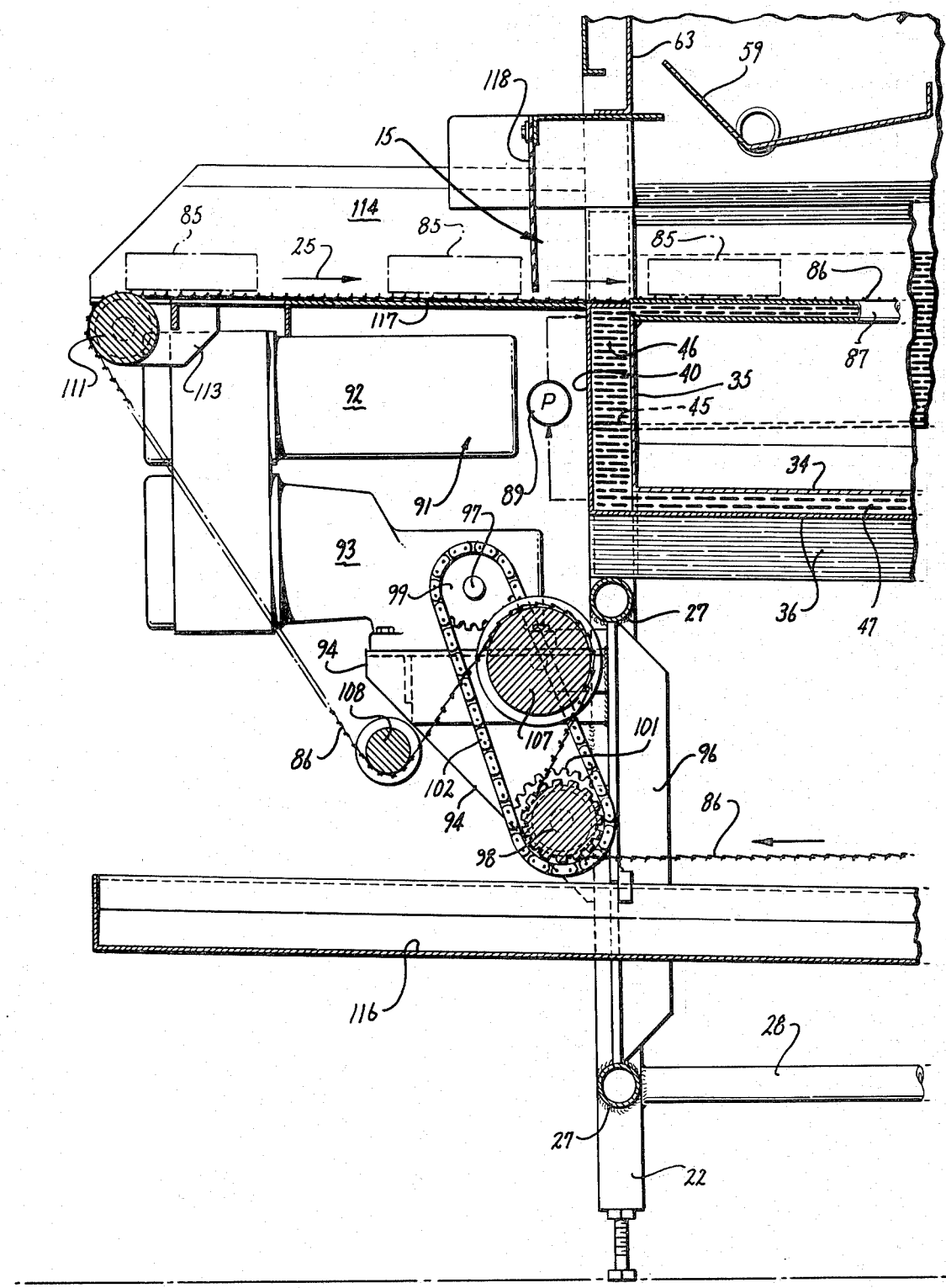
FIG. 5 is a view taken in the direction of the arrows 5—5 of FIG. 4.
Figure 6:
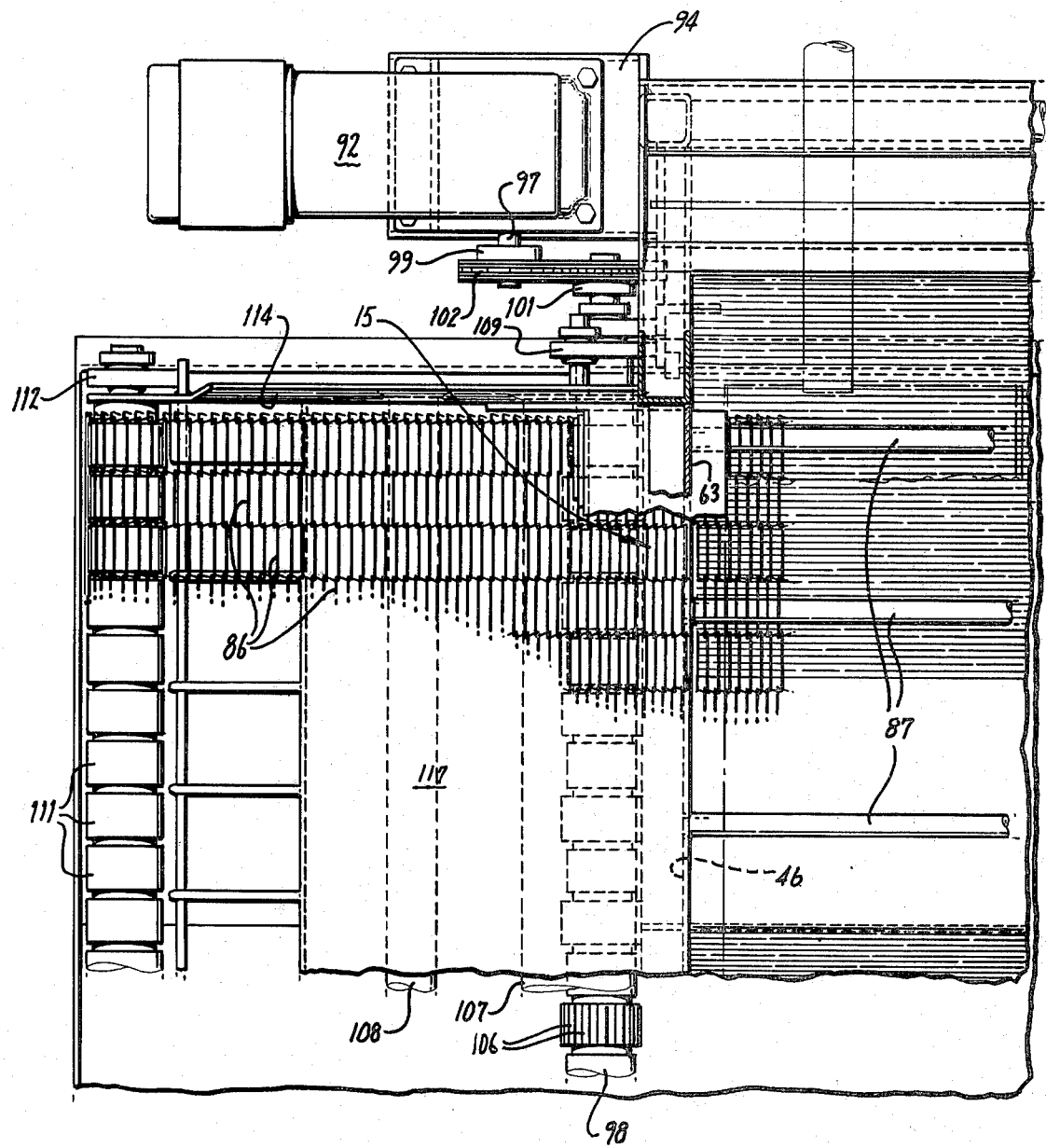
FIG. 6 is a view taken in the direction of the arrows 6—6 of FIG. 4.

The arrangement of the walls at the ends of the lower shell are substantially the same at each end and a typical section is shown is FIG. 5. There it will be seen that inside 35 and outside 40 end walls are arranged spaced apart to provide coolant circulation therebetween and a horizontal baffle 45 is interposed midway along the end walls so as to divide the end portions into upper and lower circulation compartments. The upper compartment 46 is arranged so that the coolant may communicate with the coolant passageways in the tubular supports for the conveyor, as will be explained more fully below.

The upper shell or upper housing 12 is of substantially larger volume than the lower shell which encloses the cooking chamber 41, as may be seen from FIGS. 1A, 1B, 2 and 3. The upper shell 12 is of double wall construction and provides an insulating air space 54 between the outer radiation shield 56 and the inner chamber wall 57. Inside, the upper shell portion provides a process vapor heating chamber 51 which is equipped with the burner 18 operating within the chamber 51 and the fan 17 which serves to circulate the process vapor from the heating chamber into and from the cooking chamber. The process vapor returns from the cooking chamber through the gap 52 (FIG. 1B) between the cooking and heating chambers and in so doing, the process vapor passes across the two steam discharge nozzles 19 which serve to charge the process vapor with saturated steam. It will be appreciated that the covers 39 or pans supported by the side walls 37 define the lower boundary of the heating chamber 51, as may be seen in FIGS. 1A, 1B, 2 and 3.

To minimize cooking odors in the surrounding plant and to positively vent the oven to the out-of-plant atmosphere or to a fume disposal apparatus, each end of the upper housing portion 12 is equipped with a double-walled stack 58 (FIGS. 1A and 1B). Each stack is equipped with an exhaust fan (not shown) which operates to effect circulation from the oven interior, as indicated by the arrows 64 in FIGS. 1A and 1B. Air drawn into the oven through the oven inlet 15 or outlet 20 passes largely up the stack, being drawn across the gap established by the reception baffle 59 and into the flue section 61 defined by the end baffle 62 spaced from the inside end walls 63 of the housing 12. Thus a draft of air is swept in through both the oven inlet 15 and outlet 20 and up the flue 61, and this draft entrains a minor portion of the process atmosphere taking it up the stack 58 which is replaced, it is believed, by the process steam supplied from the nozzles 19. The stacks 58 are telescopically related to the associated plenums 60 (indicated in FIG. 8 by broken lines) so as to accommodate the vertical movements of the upper shell portion 12.

Referring now to FIGS. 1B, 3 and 8, the burner assembly 18 is arranged with respect to the heating chamber 51 so as to discharge therein a jet 66 of flame and combustion gases generally concurrently to the direction of flow of the process atmosphere and in the embodiment the burner projects at an angle of approximately 45° and oriented forwardly in the direction of flow, as indicated by the arrows 21. Alternatively, an electric powered, cal-rod unit (not shown) may be installed where it is desirable to eliminate the combustion products from the process vapor. The burner assembly 18 is supplied with natural gas or other suitable gaseous fuel from the gas conduit 67 which is in communication with a gas source. The burner assembly includes an electric motor 68 operatively coupled to a blower 69 for supplying the necessary volume of air to the burner. The entire burner unit is mounted on a framework 71 on the top of the oven housing. A suitable burner assembly is one manufactured by the Maxon Premix Burner Co., Inc. of Muncie, Ind., Model No. 435 which can provide an output of 3.5 million B.T.U.'s per hour. A spray shield 72 is mounted for pivoting movement so as to cover the discharge of the burner during oven cleaning operations. As shown in FIG. 1B, the spray shield is disposed in the out-of-the-way position for oven operations.

Referring to FIGS. 1A and 2, it will be seen that the vapor circulating fan assembly 17 is mounted in the upper shell portion in a protective nacelle 77 so that the electric motor 76 is shielded from the oven atmosphere by the double wall of the nacelle. On each side of the oven the nacelle 77 is open affording air coolant to the motor 76. A drive shaft 78 extends from the fan motor 76 through an opening 79 into the heating chamber 51 and a fan impeller 81 is secured on the shaft 78 to rotate within a shroud 82. An array of stator vanes 83 (FIGS. 1A and 2) are arranged between the side walls 57 downstream of the fan for regulating the flow of the process atmosphere to the inlet opening 53 between chambers 41 and 51.

An eight-bladed, 27-inch fan wheel driven by a 7½ horse power motor was found suitable for the circulating fan assembly 17, and to provide a mass flow of 1200–1300 cubic ft. per min.

Referring to FIGS. 1A and 1B, 4, 5 and 6, the endless conveyor 16 for carrying the product 85 through the oven includes the endless conveyor belt 86 which, for example, may be formed from flat, flexible wire belt material employing wire 0.072 inches diameter arranged on a ½ inch pitch. The belt 86 extends the entire length of the oven and thus extends through both the oven inlet 15 and outlet 20, shown in FIGS. 1A, 1B. The belt itself is of open construction and is therefore pervious to the process vapor so that the product 85 will be contacted by the process vapor through the belt. This is important in cooking the undersides of chicken parts and the like products and eliminates the requirement of turning the product over to cook the underside.

The belt is supported along its length inside the oven so as to readily permit circulation of the process vapor through the belt. More particularly, the belt support includes a plurality of longitudinally extending, water-cooled, pipe supports 87 which are supported vertically from the side walls 37 of the lower shell portion by the tubes 88 arranged, as appears in FIG. 7, in a square loop configuration. The tubes 88 are supported at the side walls 37 by brackets (not shown). Coolant is circulated through both the longitudinally extending belt supports 87 and through the tube supports 88 to maintain those members at a sufficiently low temperature so that cooking products are not burned on and therefore these members remain in a relatively clean condition throughout oven operation. The conveyor supports 87, 88 are in communication with a coolant header provided by the upper compartment 46 of the oven end wall (FIG. 5). A pump 89 is provided for circulating liquid both in the conveyor supports and in the coolant spaces or passageways 47 along the bottom wall. At the product discharge end of the oven a similar manifold or header compartment 46 is provided in the end wall and is arranged in communication with the longitudinal pipe supports 87.

Figure 4:
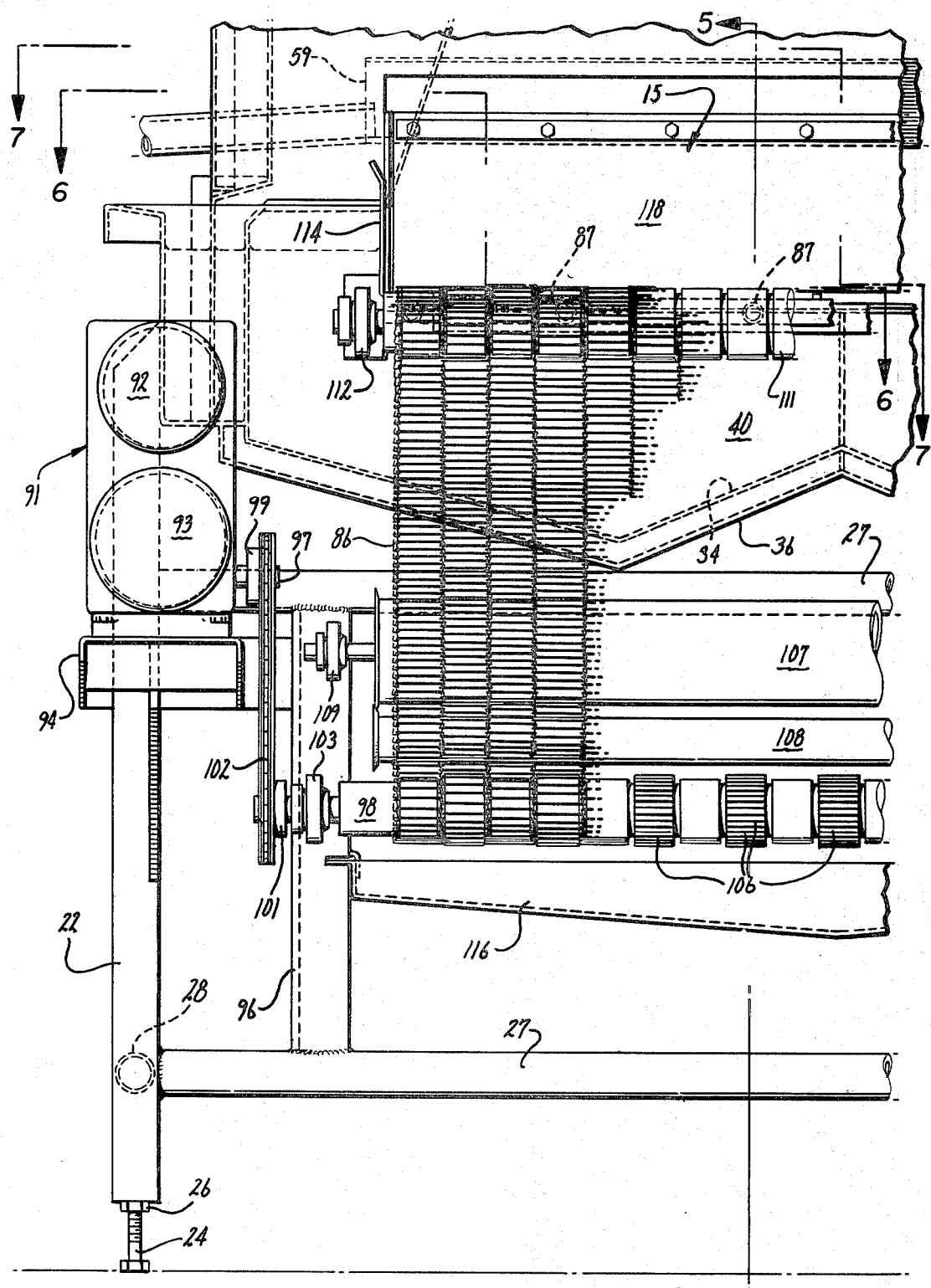
FIG. 4 is an enlarged, fragmentary view taken in the direction of the arrows 4—4 of FIG. 1A.

A conveyor drive unit 91 is arranged at the feed end of the oven (FIGS. 4, 5 and 6) and includes, for example, an electric motor 92 coupled to an adjustable, variable speed reduction unit 93 which is mounted upon a support bracket 94 which is suitably secured to the oven framework 14. The output shaft 97 of the speed reduction unit 93 is coupled to the conveyor drive roller 98 through the sprockets 99 and 101 and chain 102, as shown in FIGS. 4 and 5. The drive roller 98 is rotatably supported at each of its ends by bearing structure 103 mounted upon a structural angle member 96 arranged vertically between the frame cross-members 27, as shown in FIG. 4. The drive roller is provided with suitable teeth 106 for engagement with the wire mesh belt 86 so that the wire mesh belt may be positively driven by the roller 98. To regulate the tension within the wire mesh belt 86, apparatus is provided including two rollers 107, 108 which are adjustably mounted with respect to the framework and so arranged to provide the necessary wrap of the belt around the drive roller, as shown best in FIG. 5. The bearings 109 serve to support the larger of the two tension rollers 107 with respect to the member 96, as shown in FIG. 4. By moving the smaller of the two rollers 108 in the vertical plane, as viewed in FIG. 5, the degree of tension within the wire mesh belt may be regulated.

At each end of the oven there is mounted an idler roller 111 about which the belt is reeved to establish the plane of the belt through the oven proper. Each idler roller 111 is rotatably supported at its ends by bearing structure 112 (FIG. 4) mounted upon a bracket 113 made integral with the side plate 114 rigidly connected to the lower portion of the housing.

At each oven inlet 15 and outlet 20 there is arranged beneath the conveyor belt 86 a belt support plate structure 117 rigid with the side plates 114 and serving to establish, respectively, a product loading and a product discharge station for the oven. A flexible flap member 118 is arranged, as shown in FIG. 5, over each inlet 15 and outlets 20 so as to retain the process atmosphere within the oven and to minimize air entrainment therein, while affording easy passage of the product 85 carried by the belt with respect to be processing chamber.

As shown in FIGS. 1A and 1B, a drip pan 116 is provided on the framework and is disposed below the lower run of the belt 86. The drip pan is sloped towards its center and is equipped with a drain (not shown) to facilitate cleaning.

A clean-in-place liquid spray system is incorporated into the oven 10 so that following an operational run the oven interior may be thoroughly cleaned to meet governmental and industry standards of cleanliness. The spray system includes an array of spray nozzles 121 disposed in both the heating chamber 51 (FIGS. 1A and 1B) and in the cooking or processing chamber 41 (FIG. 2). During the cleaning operation the nozzles are supplied with cleaning and rinsing solutions through suitable conduits (not shown) and the solutions are recirculated through the cleaning system at desired rates and temperatures from a supply of such solutions located outside of the oven. The drain 33 in the bottom of the lower housing unit serves, during the cleaning operation, to carry off the cleaning fluids and entrained cleanings.

Mentioned above was the function of raising or elevating the upper housing portion 12 from the lower housing portion (FIGS. 1A, 1B, 8-10). As may be seen best from FIGS. 9 and 10, the system for raising the upper housing portion 12 comprises four hoists 23 arranged in pairs, the upper ends of which are connected to a transversely extending lifting tube 124 (FIGS. 2 and 3) which extends through the upper housing portion. Each of the hoists or jacks 23 is mounted upon a platform 125 rigidly secured to and disposed between two adjacent legs 22. Each hoist or jack assembly 23 includes a base 128 secured by fasteners 129 to the platform 125 and a vertically extending internal jack screw 131 operatively mounted at its lower end in a bearing (not shown) and a cooperative lifting nut 132 fixedly secured to a tubular strut 133 which is joined by a pin 136 to the laterally extending lifting tube 124, as shown in FIG. 10. An outer housing 137 encloses the tubular strut 133 and is rigidly mounted upon the base 128 of the hoist, the housing being equipped with an annular guide cap 138 through which the strut 133 may slide freely. Within the strut the upper end of the jack screw 131 is equipped with an alignment spool 141 which slides freely with respect to the inside surfaces of the strut 133 so as to maintain the jack screw 131 centered within the strut 133. Rotation of the jack screw 131 serves to raise or lower through the lifting nut 132 the tubular strut 133 and in turn the upper housing portion through the lifting tube 124, it being understood that there are four jack screws which operate in unison through a drive system to be described immediately below.

More particularly, it will be seen from FIG. 9 that there is provided a right angle drive motor 127 which is coupled through a shaft 126 to two right angle gear drive units 129 which in turn are each coupled by laterally extending shafts 123 to the hoist units 23. Pillow blocks 142 are provided at intervals to support the shafting, as shown. As indicated by the arrows 144, FIG. 9, rotation of the shafting through operation of the drive motor 127 in the directions indicated serves to raise the upper housing assembly to a raised position as shown in FIG. 8. Conversely, rotation of the shafting in the direction opposite to that indicated by the arrows 144 will serve to lower the upper housing unit again into the position as shown in FIGS. 1A and 1B. Suitable limit switches (not shown) are provided for stopping the drive motor 127 when the limits of travel of the jack screws have been reached.

Means are provided for detecting and regulating the moisture content of the process atmosphere within the oven 10. Referring particularly to FIGS. 1B, 3 and 11, the moisture control unit 146 may be arranged in the moving process atmosphere within the heating chamber and includes a fine spray nozzle 147 which projects a spray of water against a spaced apart iron-constantan, "J" thermocouple 148, both arranged within an open-ended duct 149, FIG. 1B. The nozzle 147 projects a spray concurrent to the flow of the process atmosphere within the heating compartment and thus the "wet bulb" thermocouple 148 is disposed downstream of the spray nozzle 147. A second or "dry bulb" thermocouple 151 is disposed within the oven preferably within the heating chamber 51 and also extends into the path of the circulating atmosphere. The thermocouple 148 is electrically coupled to a controller recorder 152 which serves to sense the electrical output of the thermocouple and to respond to established control limits through a pneumatic output to a pre-arranged setting.

The controller output is coupled to a pneumatically operated steam valve 153 in the steam supply line 161 so as to operate the valve 153 for regulating the steam supply to the steam nozzles 19 so as to achieve and maintain a pre-set moisture content of the process atmosphere. Shutoff valves 154 are provided in the steam line 161.

The thermocouple 151 is electrically coupled to a controller recorder 172 which serves to sense the electrical output of the thermocouple 151 and to respond through a pneumatic output to a prearranged setting. The output of controller 172 is coupled to a pneumatically operated gas valve 173 in the gas supply line 67 so as to operate the valve 173 for regulating the gas supply to the heating unit 18 so as to achieve and maintain the pre-set oven temperature.

Steam in this embodiment is supplied to the line 161 at a pressure from 25-35 psig and at a saturated quality of and at a temperature of between 260°-281° F. A spray of hot water may be substituted for the saturated steam. A satisfactory spacing for the nozzle 147 from the "wet bulb" thermocouple 148 has been found to be on the order of 16 inches and a satisfactory flow through the nozzle 147 is on the order of 0.06 gallons per minute. Water is supplied to the line 156 at a pressure of about 15-20 psig and at a temperature which may vary between 50°-200° F., but preferably at about 60° F. In the water supply line 156 there is provided a strainer 157, a pressure regulating valve 158 and shutoff valve 159.

The moisture control unit 146 works on the principle that a water droplet sprayed into a hot atmosphere will change in temperature until it reaches a point where the partial pressure of the water vapor from the droplet equals the partial pressure of water vapor in the process atmosphere or the dew point temperature. If the droplet temperature is initially higher than the equiblibrium or dew point temperature, then water evaporates from the droplet surface, dissipating heat energy from the droplet until its temperature falls to dew point temperature. On the other hand, if the initial droplet temperature is lower than the equilibrium temperature, moisture from the atmosphere condenses on the surface of the droplet supplying energy until the droplet rises to the dew point temperature. The droplet temperature adjustment is virtually independent of the normally measured dry bulb oven temperature and is a function of moisture content of the process atmosphere. Thus, the measurement of the droplet temperature after it has reached equilibrium is then a measure of the partial pressure of water vapor in the atmosphere and which may be converted to give the composition of moisture by volume in the process atmosphere. This measurement is made through the use of the controller 152 or through psychometric tables the temperature reached by the dry bulb thermocouple 151 and that reached by the "wet bulb" thermocouple 148.

Fresh filtered water is continuously introduced through the water supply line 156 and once the water has been sprayed against the wet bulb thermocouple it is dumped through the duct 149 into the space 41 below the conveyor belt. This procedure keeps the thermocouple 148 in a clean condition being constantly washed by the water spray.

The present invention is predicated on the fact that water vapor or steam has an enlivening effect upon the appearance and flavor of certain food products such as meat patties, salisbury steak, chicken parts, etc. This effect is vastly enhanced when the cooking takes place largely in the absence of air so as to reduce or minimize the degenerative effect of oxidation and drying out of the product.

The present invention also makes possible a very rapid processing cycle which is contributable to a high heat transfer rate from the moisture-laden process vapor to the relatively cooler product such that moisture from the process atmosphere may leave the vapor state and condense upon the product releasing the heat of the vaporization. This phenomenon is particularly present as the product first enters the cooking chamber which is the moment when the temperature differential between the process atmosphere and the product is the greatest. The condensing of moisture upon the product tends, it is believed, to seal in moisture contained within the product and minimizes the tendency for a product to dehydrate such as when process in a substantially dry, rapidly moving, e.g. 1200–2400 feet per minute, gaseous stream. The process may be readily controlled by means including the moisture control system 146 so as to maintain one preferred high percentage of water vapor or steam in the process atmosphere, e.g. 30 to 51%, and permitting food treatment to occur at a relatively high processing temperature, e.g. 400° F.–600° F., without deterioration or burning of the product, in this one preferred range. If it is desired to process certain food products at a lower temperature, e.g. about 165° F., for the sake of appearance, yield, flavor or any similar property, it is only necessary to reduce the output of the heating unit 18 and to select a corresponding processing time in order to obtain a thoroughly acceptable result.

The apparatus and process have been in successful operation in a range of moisture content as low as 8–11% in the 450°–600° F. range for meat patties to achieve particular finished color characteristics. Temperatures as low as about 250° F. for the gas fired unit and as high as about 1100° F. for the cal-rod unit have been employed for such products as unbreaded chicken and turkey breasts on the one hand, and meat patties on the other, to achieve particular treatment times and finished appearance characteristics. For an electric heater unit (not shown), temperatures as low as about 165° F. have been employed for shrimp.

The process disclosed here is of considerable versatility insofar as the operant conditions can be readily and rapidly changed. For example, to increase the temperature from about 200° to 400° F. or, respectively decrease it by that amount, or to change the moisture content of the process vapor, requires no more than about one minute in time. It is thus possible to process in rapid succession a variety of food products, to be packed into combination meals such as TV dinners, and similar items.

Figure 12:
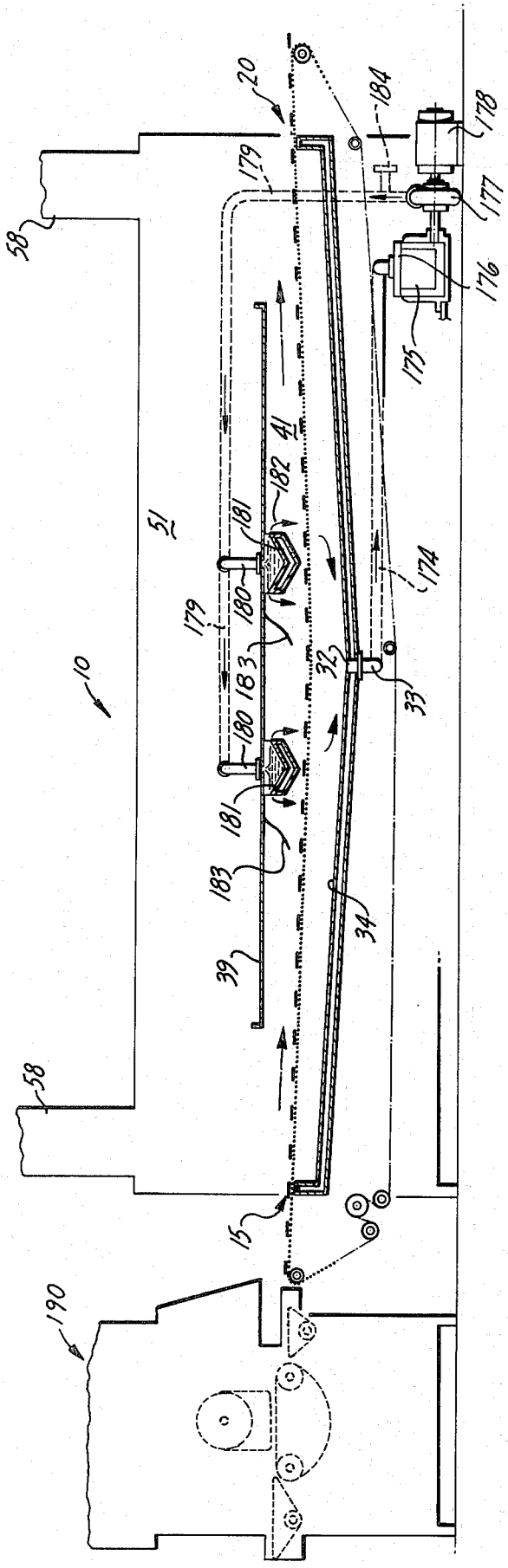
FIG. 12 is a longitudinal sectional view of the oven and pre-treatment unit and showing means for basting the product and for recovering and recirculating the basting materials.

The process also provides for recovery of the juices and fats drippings for re-use in gravies and the like. Referring to FIG. 12, a collection plate, inside wall 34, which receives the renderings and drippings from the food on the conveyor 16 is maintained at a temperature between 175 and 195 degrees to prevent the juices and fat from the drippings from solidifying.

In one preferred embodiment of the invention the drippings flow from the collection plate through the drain nozzles 32 to the manifold 33, and from the manifold through a downward sloping pipe 174 into a container 175 which is provided with a strainer 176 to screen out solid food particles which may have been detached from the food during treatment and carried away along with the drippings. A pump 177, actuable by an electric motor 178 pumps the liquids from the vessel 175 into an L-shaped pipe 179. One leg of the pipe 179 extends longitudinally through the heating chamber 51 in a substantially horizontal direction. A plurality of nozzles 180 on the horizontal portion of pipe 179 communicate with vee-shaped headers or troughs 181 which are suitably supported in the cooking chamber. The liquid overflows the troughs 181 onto the product as a basting medium and is recirculated. The distribution of fluid from the headers 181 over the food on the conveyor is indicated by the arrows 182. Starter blades 183 are attached at one of their ends to the cover or partition 39 and are disposed upstream of the headers 181 to prevent the process vapor stream from unduly interfering with the direction of the fluid deposited from the units 181 with respect to the food elements on the conveyor.

In one preferred embodiment of the invention a flavor feed inlet 184 is provided in the vertical portion of pipe 179 through which a predetermined amount of flavoring or seasoning material may be introduced either alone or into the upward-moving basting liquid, to be mixed therewith before it is distributed over the food. In this way various agents can be added which greatly enhance the appearance or the flavor of the finished food and increase its appeal to the consumer both at the point of sale and at the point of consumption.

For the treatment of certain types of food, liquid material may be introduced by itself through inlet 184, even if there is no release or recirculation of drippings from the food through the apparatus as described heretofore. French fried potatoes, for example, treated at 230–250 degrees in an atmosphere having a 40% moisture content, may be advantageously supplied with an overhead spray of plain or flavored cooking oil introduced through the inlet 184 and the associated distribution means, to seal in the inherent moisture of the potato pieces between the crusty outer surfaces.

To ready the oven for processing a solid food product such as chicken parts, meat patties, frozen products, etc., the conveyor is set into operation and the exhaust fans (not shown) connected to the stacks 58 are set into the condition for withdrawing air through the oven inlet 15 and outlet 20 and a portion of the process vapor from the oven to the stacks to minimize cooking odors escaping into the plant. Then the oven is brought up to the desired temperature by actuating the heating unit 18, be it gas or electric (not shown), and setting the fan 17 into operation so as to circulate the atmosphere within the oven. As operational temperature is approached, steam is injected into the processing chamber through the nozzles 19 to reach the established or selected moisture content for the operational temperature.

Solid food products 85 in discrete pieces are placed upon the belt at the loading station established at the left end of the oven, as viewed in FIG. 1A. As products 85 are moved by the belt they are carried through the fabric curtain 118 into the processing chamber and through the entire length of the oven in their original positions, leaving the oven through the outlet 20 to the discharge station on the right, as shown in FIG. 1B. The process vapor is circulated above, below and through the conveyor belt 86 being that the belt is of open construction and is arranged for easy passage of the process vapors therethrough. The product 85 is cooked or treated by the process atmosphere on all sides without the necessity of turning the product over to treat the bottom side. The fan 11 propels the process vapor through the processing chamber or cooking chamber 41 through the opening 52 back into the heating chamber 51. As the stream or draft passes through the opening, steam or a hot water spray from the nozzles 19 is injected into the moving stream. As shown in FIGS. 2 and 3, the respective transverse cross-sectional areas of the cooking compartment above and below the conveyor belt 86 are substantially the same. Thus, the rate of vapor flow above and below the conveyor belt will be substantially the same providing even heat transference from the process atmosphere to the product on all sides. Drippings from the product fall through the conveyor belt 86 to the cooled walls 34 and are carried to the drains 32 and out of the unit. Further, the juices may be used to baste products during processing.

EXAMPLES

The utility of the process disclosed herein may be appreciated best by reference to results achieved in tests with a prototype unit. For example, in a series of tests the prototype unit was adjusted so that the process atmos here moved at an average velocity of about 1200 feet per minute with the temperature of the cooking chamber at about 500° F., and with a moisture content of the process atmosphere at about 46%. Two different meat products were processed with the resulting product having a highly desirable, commercially acceptable appearance and good moisture content. These two products were meat patties containing beef and meat patties containing principally pork.

Considering first the batch of beef meat patties, these were five-ounce individual patties of approximately ½ inch thickness and having an aggregate batch weight of 1 lb., 4½ ozs. The temperature of the patties was 35° F. prior to entry into the process. Immediately after leaving the cooking chamber the patties had an aggregate batch weight of 1 lb. 1.9 ozs. and had achieved a center temperature of 144° F. The loss of weight amounted to 12.7% and the time in process was 3 minutes, 45 seconds.

The batch of pork patties was processed for a similar 3 minutes 45 seconds time period and was also nominally 5 oz. patties of ½ inch thickness, the batch weighing 1 lb., 3.6 ozs. The temperature of the patties was 42° F. before entering the cooking chamber. The weight of the batch upon exit from the cooking chamber was 15.9 ozs., or a loss of 18.9%, and the center temperature of the patties was 152° F. The meat patties in each instance were cooked to a satisfactory degree, as evidenced by the internal temperature and the appearance in color. The moisture content and appearance was vastly superior in a commercial sense for bulk food processing.

Another example of employing the process on a meat product was a test in the prototype unit of cooking salisbury steaks in pieces of about 3 ozs. each with the batch total weight of 3 lbs., 5 ozs. The moisture content of the process atmosphere was maintained at about 46%, temperature at about 450° F. and the process atmosphere velocity at about 1200 feet per minute. Temperature of the product prior to entry into the cooking chamber was 28° F. The temperature of the product upon exit from the cooking chamber was 140° F. and the weight of the batch upon exit was 3 lbs., 1.8 ozs. or a loss of 6%. The processing time was 2 minutes, 30 seconds. The product was found satisfactory in appearance and the degree of cooking even with the rapidity of the cooking operation.

A fourth example concerns the use of the process in a test for cooking chicken parts comprising two chickens having a batch weight of 1330 grams with an average weight per part of 83 grams. This batch of chicken parts was placed in a batter before cooking which raised the batch weight to 1715 grams before entry into the prototype cooking unit. On entry into the cooking unit the temperature of the chicken parts was about 80° F. and upon exit from the cooking unit the temperature at the bone was between 185°–195° F. The oven temperature was 375° F. with the moisture content between 45–46%. Cooking time was 14 minutes, 30 seconds. The weight of the batch upon exit from the cooking unit was 1505 grams and the loss was 210 grams or 12.2%.

A fifth example concerns a test for cooking meat patties each weighing about 2 ozs. with a batch weight of 2 lbs., 0 ozs. The temperature of the product before entering the cooking chamber was about 40° F. and the temperature of the patties' center upon exit from the chamber was about 145° F. The weight of the batch following processing was 1 lb., 12.8 ozs., or a loss of 10%. The process atmosphere was maintained at a velocity of about 1200 feet per minute and a temperature of 600° F. with 10% moisture content, no steam being introduced into the process atmosphere. The moisture was derived from products of combustion and evaporation from the product itself. The cooking time was 1 minute, 10 seconds. The product had a good appearance and a thorough cooking in a relatively short period.

The initial temperature differential between the product entering the unit and the process vapor, as demonstrated in the above examples, falls in the range of 295° F. to about 560° F. It was observed that this effected a rapid surface treatment of the product with some moisture from the process atmosphere condensing on the product and releasing the latent heat of vaporization. The temperature differential decreases as a product continues through the unit reaching a minimum at the product exit. The heat input and atmosphere circulation rate is selected to permit a temperature drop throughout the unit.

The five examples above demonstrate to the skilled art worker that the process disclosed herein achieves a cooked product having an excellent appearance, good moisture content with a short processing time.

In one preferred embodiment of the invention various preparation methods are applied to the food prior to its admission into the oven according to the invention. Such pre-treatment introduces a variety of texture, shape, taste, appearance and other characteristics which influence consumer acceptance of the finished products. Apparatus for such pretreatment is juxtaposed with the oven according to the present invention, so that the pre-treatment and the final treatment are executed in one continuous process.

As shown schematically in FIG. 12 a pre-treatment apparatus 190 may include, for example, a food searer or brander as disclosed in the co-pending application, Ser. No. 653,912 filed Jan. 28, 1976, now U.S. Pat. No. 4,023,195 which is a continuation of application, Ser. No. 489,131, filed July 17, 1974, and now abandoned to provide the appearance and flavor of char-broiled food by searing the surface and branding the upper and lower surfaces with hot branding elements. The rapid processing time through the brander does not raise the interior temperature of the meat products much above the range of 36 to 40 degrees F. which is approximately identical with the temperature of meat products entering the oven without such pre-treatment.

Other pre-treatment apparatus 190 may comprise one or more containers filled with a liquid through which the food is transferred. The liquid may be a marinating medium or, in another example, steam for scalding or blanching. In yet another embodiment the liquid may be oil at a temperature between 220° and 400° F. in which the food is immersed for a pre-determined period, according to the type of food and its physical dimensions. Soybean cakes, for example, preformed into small cubes, are immersed in hot oil for a period of 6 minutes before they are transferred into the oven according to the invention. In this case pre-treatment is adapted to expand the product and puff it up while yet retaining the cubic shape. Deep-frying of chicken parts in hot oil for a period depending on the size of the parts not only provides a crisp brown surface crust but decreases the shrinkage loss during processing in the oven according to the invention.

Another pre-treatment apparatus may contain a mixer adapted to add vegetable protein matter to products such as meat patties or meat loaf, to stabilize their eventual size regardless of the shrinkage due to the discharge of fats and liquids during the cooking process in the oven.

Another example of pre-treatment apparatus may be a device for spraying a layer of hot oil on food such as potato sticks which are to be processed into french fries and which are required to have a crisp brown outer surface enclosing a well-cooked soft inner portion.

Finally, a pre-treatment apparatus may simply involve a warming surface or environment to thaw pre-frozen blocks of food to the point where they can be divided into discrete pieces suitable for introduction into the oven according to the invention, and for subsequent processing therein.

From the above, it will be apparent to the skilled art worker that changes and modifications can be made to the food treatment process disclosed herein. irrespective of those modifications, the invention shall be limited only by the terms of the following claims.

We claim:

1. In a rapid continuous process for heating and cooking foods, the steps of forming a treating zone within a substantially closed treatment chamber, said chamber having inlet and outlet openings, introducing food to said chamber in the form of solid discrete pieces, said food moving through said chamber along a pathway extending through said inlet opening and said treating zone and exiting through said outlet opening, generating a gaseous process vapor within said treatment chamber and rapidly and continuously circulating the same along the pathway in said treating zone in a direction concurrent to the direction of movement of said food, heating said rapidly circulating process vapor to continuously maintain the temperature thereof within the range from 165° to 600° F., the temperature of said rapidly circulating process vapor bearing a relationship to the entering food such that a substantial temperature differential exists between the food and process vapor ranging to as much as 295° to 560° F., said food being moved in a concurrent direction with said rapidly circulating process vapor at a rate and for a distance to effect heating and cooking thereof for a period of time sufficient to raise the center temperature of said discrete pieces of food to within the range from 140° to 195° F., intermittently releasing saturated steam into said rapidly circulating and heated process vapor to raise the moisture content thereof continuously removing external air from adjacent the inlet and outlet openings of said treating chamber to thereby substantially prevent the entry of external air to said treating zone, such exclusion of air serving to limit the proportion of air within the process vapor continuously and rapidly circulating within said treatment chamber and through said treating zone, continuously monitoring the moisture content of said rapidly circulating process vapor to determine variations in the moisture content and continuously using the variations in moisture content so determined to control said intermittent release of saturated steam to the process vapor being rapidly circulated within said treatment chamber, thereby to provide a rapidly and continuously circulating process vapor of controlled temperature and moisture content as needed and desired for heating and cooking particular foods undergoing treatment.

2. A continuous process as in claim 1 wherein said process vapor is circulated at a flow rate within the range from 1200 to 2400 feet per minute.

3. A continuous process as in claim 1 wherein said saturated steam is released into said rapidly circulating process vapor at a temperature of from 260° to 281° F.

4. A continuous process as in claim 1 wherein the moisture content of said rapidly circulating process vapor is maintained at a level which at all times is in excess of 8%.

5. A continuous process as in claim 4 wherein the moisture content of said rapidly circulating process vapor is within the range from 30 to 51%.

6. A continuous process as in claim 1 including the further step of collecting rendering and drippings from food products undergoing treatment in said treating zone on a relatively cool surface within said treating zone, and withdrawing said renderings and drippings from the treatment chamber for further use.

7. A continuous process as in claim 6 wherein said relatively cool surface is maintained at a temperature within the range from 175° to 195° F.

8. A continuous process as in claim 6 wherein said renderings and drippings withdrawn from the treatment chamber are returned into contact with said discrete pieces of food moving along said pathway extending through the treating zone.

9. A continuous process as in claim 1 including the further step of subjecting said solid discrete pieces of food to pretreatment prior to introducing the same to said treating chamber, said pretreatment being selected from the group consisting of deep oil frying, flame searing, branding by surface searing, blanching and thawing.

10. A continuous process as in claim 1 including the further step of subjecting said solid discrete pieces of food while moving along the pathway extending through said treatment zone, and while in contact with said process vapor, to a spray of oil.

11. A continuous process as in claim 1 wherein said discrete pieces of food are moved through said treating zone at a rate sufficient to effect heating and cooking thereof for a period of time within the range from 1.2 to 14.5 minutes.

12. A continuous process as in claim 1 wherein the solid discrete pieces of food introduced to said treatment zone are maintained in original positions as they are moved through said treating zone to thereby maintain the individual shape and integrity of said solid discrete pieces of food as final products.

13. A rapid continuous process for heating and cooking foods comprising the steps of forming a treating zone within a substantially closed treatment chamber, from which air is substantially excluded, said chamber having inlet and outlet openings moving individual units of food through said chamber along a pathway extending through said inlet opening and said treating zone and exiting through said outlet opening, generating a gaseous process vapor within said treatment chamber and rapidly and continuously circulating the same along said pathway in the direction concurrent to the direction of movement of said food, separately heating said rapidly circulating process vapor to continuously maintain the temperature thereof within the range from 165° to 600° F., the initial temperature of said units of food moving through said treatment zone being such that there is a substantial temperature differential between the food and the circulating process vapor, said food being moved through said treatment zone along said pathway at a rate to effect heating and cooking thereof in the presence of said rapidly circulating process vapor and to raise the center temperature of said units of food within the range from 140° to 195° F., intermittently releasing saturated steam into said rapidly circulating and heated process vapor to raise the moisture content therof continuously monitoring the temperature of said rapidly circulating process vapor to determine variations thereof, and continuously using the variations in temperature so determined to control the separate heating of said circulating process vapor, and continuously monitoring the moisture content of said rapidly circulating process vapor to determine variations in the moisture content and continuously using the variations in moisture content so determined to control said intermittent release of saturated steam to the process vapor being rapidly circulated within said treatment chamber, thereby to provide a rapidly and continuously circulating process vapor of controlled temperature and moisture content as needed and desired for heating and cooking particular foods undergoing treatment.

* * * * *

Disclaimer 4,167,585.—*Andrew A. Caridis*, Foster City and *Clark K. Benson*, Millbrae, Calif. METHOD FOR HEATING AND COOKING FOOD IN A CLOSED TREATMENT CHAMBER BY MAINTAINING THE TEMPERATURE AND MOISTURE CONTENT. Patent dated Sept. 11, 1979. Disclaimer filed June 6, 1986, by the assignee, *Heat and Control, Inc.*

Hereby enters this disclaimer to claim 9 of said patent.

[*Official Gazette October 14, 1986.*]

REEXAMINATION CERTIFICATE (328th)
United States Patent [19]
Caridis et al.

[11] B1 4,167,585

[45] Certificate Issued Apr. 2, 1985

[54] METHOD FOR HEATING AND COOKING FOODS IN A CLOSED TREATMENT CHAMBER BY MAINTAINING THE TEMPERATURE AND MOISTURE CONTENT

[75] Inventors: Andrew A. Caridis, Foster City; Clark K. Benson, Millbrae, both of Calif.

[73] Assignee: Heat and Control, Inc., San Francisco, Calif.

Reexamination Request:
No. 90/000,545, Apr. 18, 1984

Reexamination Certificate for:
Patent No.: 4,167,585
Issued: Sep. 11, 1979
Appl. No.: 853,503
Filed: Nov. 21, 1977

Related U.S. Application Data

[63] Continuation of Ser. No. 662,512, Mar. 1, 1976, abandoned, which is a continuation-in-part of Ser. No. 544,393, Jan. 27, 1975, Pat. No. 3,947,241, which is a continuation of Ser. No. 328,925, Feb. 2, 1973, abandoned.

[51] Int. Cl.³ .................... A22C 17/00; A22C 25/00; F27B 9/00; F27B 9/14
[52] U.S. Cl. .................... 426/233; 99/331; 99/443 C; 99/474; 426/307; 426/438; 426/510; 426/511; 426/523; 432/23; 432/37
[58] Field of Search ............ 426/233, 307, 438, 441, 426/474, 509, 510, 523, 520, 511; 99/360, 361, 362, 443 C, 450, 474, 477, 386, 331, 325; 432/14, 23, 37, 121, 144, 148, 152, 176, 198

[56] References Cited

U.S. PATENT DOCUMENTS

| | | |
|---|---|---|
| 810,864 | 1/1906 | Hoover et al. |
| 992,488 | 5/1911 | Von Epler ............ 426/510 |
| 1,607,826 | 11/1926 | Harber ............ 432/65 |
| 1,789,847 | 1/1931 | Smith |
| 2,199,584 | 5/1940 | Bemis ............ 426/523 |
| 2,312,339 | 3/1943 | Jones ............ 99/259 |
| 2,954,244 | 9/1960 | Austin ............ 285/11 |
| 3,001,298 | 9/1961 | Blesch et al. ............ 34/212 |
| 3,125,017 | 3/1964 | Tauber et al. ............ 99/443 |
| 3,199,436 | 8/1965 | Rasmussen et al. ............ 99/473 |
| 3,209,678 | 10/1965 | Benson et al. ............ 99/406 |
| 3,224,881 | 12/1965 | Holtz ............ 426/510 |
| 3,237,551 | 3/1966 | Keifer ............ 99/475 |
| 3,309,981 | 3/1967 | Benson et al. ............ 99/405 |
| 3,440,950 | 4/1969 | Moskal ............ 99/259 |
| 3,573,059 | 3/1971 | Yuki ............ 99/1 |
| 3,644,124 | 2/1972 | Bedsole ............ 426/233 |
| 3,736,860 | 6/1973 | Vischer, Jr. ............ 99/443 C |
| 3,764,343 | 10/1973 | Paugh ............ 426/523 |
| 3,815,488 | 6/1974 | Van Dyke, Jr. ............ 99/443 C |
| 3,865,964 | 2/1975 | Kellermeir et al. ............ 426/438 |
| 3,910,175 | 10/1975 | Smith ............ 99/477 |

FOREIGN PATENT DOCUMENTS

| | | |
|---|---|---|
| 587402 | 12/1965 | Belgium |
| 672480 | 12/1965 | Belgium |
| 930503 | 6/1955 | Fed. Rep. of Germany |
| 1429986 | 3/1971 | Fed. Rep. of Germany |
| 987633 | 11/1950 | France |
| 1048030 | 7/1953 | France |
| 34475 | 8/1905 | Switzerland |
| 338286 | 11/1930 | United Kingdom |
| 602402 | 5/1948 | United Kingdom |
| 1116831 | 5/1948 | United Kingdom |
| 746035 | 3/1956 | United Kingdom |

OTHER PUBLICATIONS

Meat Cookbook, by John and Marie Roberson; published by Henry Holt and Company, 1953; Chapter 2, Basic Cooking Methods, pp. 41–52.

The National Provisioner, Feb. 17, 1968; Patties are Ready in a Minute at Grill Meats; pp. 1–6.

Sam Stein Associates, Inc., Feb. 1968, Stein Conveyorized Food Broilers.

Quick Frozen Foods; by Harcourt, Brace & Jovanovich, New York, New York; Mar. 1970, (p. 7); Jan. 1971, (p. 15); Mar. 1971, (p. 11); Aug. 1971, (p. 17) and Sep. 1971, (p. 9).

Mechanical Engineer's Handbook by Lionel S. Marks, 4th Ed. 1941, pp. 328–332, Table 20: Properties of Saturated Steam.

Trebbler et al.; "The Freezing Preservation of Foods"; vol. 3; pp. 270-271; Easton, Pa.; Avi Publishing Co.

The Meat We Eat (1943) by P. Thomas Ziegler; published by The Interstate Printers and Publishers; Chapter XIX, pp. 293–298.

Lorain Cooking, published by American Stove Company, 1930; Preface, Chapters VII, pp. 70-93; IX, pp. 106-110; Time and Temperature Chart, pp. 180-182.

Handbook of Food Preparation, published by The American Home Economics Association, 6th Edition, 1971, Meat Chapter, pp. 67-78; p. 20, Chart of Temperatures of Food for Control of Bacteria.

*Primary Examiner*—Steve Alvo

[57] ABSTRACT

The cooking process comprises the steps of providing a food treatment chamber equipped with a vapor pervious conveyor; preparing a moving stream of a process vapor at a temperature having a lower range of between 165° F. to 212° F.; circulating the stream along the conveyor; injecting water vapor into the moving stream of process vapor and supplying heat to the moving stream to control the temperature and moisture content of the process vapor; placing the food product in discrete pieces upon the conveyor; and moving the product continuously in its original position on the conveyor through the treatment chamber.

REEXAMINATION CERTIFICATE ISSUED UNDER 35 U.S.C. 307

NO AMENDMENTS HAVE BEEN MADE TO THE PATENT.

AS A RESULT OF REEXAMINATION, IT HAS BEEN DETERMINED THAT:

The patentability of claims 1-13 is confirmed.

* * * * *